United States Patent [19]

Hobo et al.

[11] 4,134,258
[45] Jan. 16, 1979

[54] FUEL CONTROL SYSTEM

[75] Inventors: Nobuhito Hobo, Inuyama; Takashi Hasegawa, Kariya; Yoshihiko Tsuzuki, Anjo; Yutaka Suzuki, Nishio, all of Japan

[73] Assignee: Nippondenso Co., Ltd., Kariya, Japan

[21] Appl. No.: 758,486

[22] Filed: Jan. 11, 1977

Related U.S. Application Data

[63] Continuation of Ser. No. 581,698, May 28, 1975, abandoned.

[30] Foreign Application Priority Data

Jun. 10, 1974 [JP] Japan .................................. 49-65785

[51] Int. Cl.$^2$ ............................................... F02C 7/26
[52] U.S. Cl. .............................. 60/39.14; 60/39.16 R; 60/39.28 R; 60/39.28 T
[58] Field of Search ........ 60/39.28 R, 39.14, 39.16 R, 60/39.28 T

[56] References Cited
U.S. PATENT DOCUMENTS

| | | | |
|---|---|---|---|
| 3,421,317 | 1/1969 | Bedford | 60/39.28 R |
| 3,523,423 | 8/1970 | Young | 60/39.28 R |
| 3,686,859 | 8/1972 | White | 60/39.28 R |
| 3,805,517 | 4/1974 | Sewell | 60/39.28 R |
| 3,844,114 | 10/1974 | Nonnenmann | 60/39.28 R |
| 3,939,649 | 2/1976 | McCabe | 60/39.28 R |
| 3,971,208 | 7/1976 | Schwent | 60/39.28 R |

Primary Examiner—Clarence R. Gordon
Attorney, Agent, or Firm—Cushman, Darby & Cushman

[57] ABSTRACT

A fuel control system for controlling the supply of fuel to a gas turbine engine in all the engine operating ranges including the acceleration, deceleration and part-load operations. The fuel control system comprises load control signal generating means and idling control signal generating means for detecting the operating parameters of a gas turbine engine and generating a load control signal and an idling control signal each corresponding to the proper fuel feed quantity under load conditions and idling conditions, respectively, and an upper limit selection circuit for selecting greater one of the signals from the two means and generating a fuel control signal for commanding the proper fuel feed quantity.

2 Claims, 36 Drawing Figures

FUEL CONTROL SYSTEM

This is a continuation of application Ser. No. 581,698 filed May 28, 1975, now abandoned.

BACKGROUND OF THE INVENTION

1. FIELD OF THE INVENTION

The present invention relates to a fuel control system whereby various operating parameters of a gas turbine engine are detected and converted into electrical signals, and the signals are in turn applied to an electrical control circuit which generates a control signal corresponding to a predetermined fuel feed pattern.

2. SUMMARY OF THE INVENTION

It is the object of the present invention to meet the following requirements.

Namely, it is an object of the present invention to provide a fuel control system for a gas turbine engine, wherein a fuel control signal is generated to meet the optimum fuel feed quantity predetermined in accordance with the idling and load conditions, such as, the acceleration, deceleration and part load operations of a gas turbine engine.

It is another object of the present invention to provide a fuel control system for a gas turbine engine, wherein a control signal corresponding to the overspeed limit is generated for each of the compressor turbine and power turbine of a two-shaft gas turbine engine to separately limit its revolution speed to the maximum revolution speed, and these signals are overridden by another control signal corresponding to the load condition of the engine.

It is still another object of the present invention to provide a fuel control system for a gas turbine engine, wherein the pressure of air at the outlet of the compressor turbine of a gas turbine engine is detected by converting it by a semi-conductor pressure transducer or the like into an electrical signal which is in turn compared with a predetermined surging limit value of the outlet air pressure corresponding to the number of revolutions of the compressor turbine to generate a control signal corresponding to the surging limitation for controlling the feeding of fuel when the compressor turbine is on the point of surging, and this control signal is overridden by another control signal corresponding to the load condition of the engine.

It is still another object of the present invention to provide a fuel control system for a gas turbine, wherein the temperature of combustion gas or exhaust gas is converted by a thermocouple or the like into an electrical signal to generate a control signal corresponding to the overheat limitation for limiting the gas temperature below a temperature limit which is dependent on the heat resisting properties of the principal component parts of the engine, and this control signal is overridden by another control signal corresponding to the load condition of the engine.

It is still another object of the present invention to provide a fuel control system for a gas turbine engine, wherein a control signal corresponding to the fire limitation under deceleration operating conditions is overridden by another control signal corresponding to the load condition of the engine including the overspeed limitation, surging limitation, overheat limitation, etc., whereby to prevent the occurrence of a fire in the burner even under these limiting conditions.

In accordance with the present invention, there is thus provided a fuel control system for a gas turbine engine comprising load control signal generating means and idling control signal generating means for detecting the operating parameters of a gas turbine engine and generating respectively a load control signal corresponding to the fuel feed quantity required by the engine under load and an idling control signal corresponding to the fuel feed quantity under the idling conditions of the engine, and an upper limit selection circuit for selecting the greater one of the signals generated from the two means and generating a fuel control signal for commanding the proper fuel feed quantity, whereby the fuel supply to the gas turbine engine used as a prime mover for an automobile or the like can be controlled by means of a fuel control signal alone in all the operating ranges of the engine.

Further provided are overspeed limiting means for generating a fuel limiting control signal to separately limit the revolution speed of each of the compressor turbine and power turbine of the gas turbine engine to the maximum revolution speed to prevent overspeed of the two-shaft gas turbine engine under load conditions. Surging limiting means are also provided for comparing the outlet pressure of the compressor of the gas turbine engine with a predetermined surging limit value corresponding to the revolution speed of the compressor turbine and generating a fuel limiting control signal to thereby prevent the occurrence of surging.

Further provided are overheat limiting means for generating a fuel limiting control signal to limit the combustion temperature of the gas turbine engine below the heat resisting limit temperature to prevent the gas turbine engine from being damaged by the overheating thereof. Further provided are deceleration control means for generating a fuel feed control signal for the fire limitation corresponding to the revolution speed of the gas turbine engine under the deceleration conditions to efficiently control the fuel supply under the idling conditions. Lastly, compensation means are provided for compensating the fuel control signal in accordance with the amount of heat supplied to the inducted air by the heat exchanger to ensure a highly accurate fuel control that suits the performance of the heat exchanger.

BRIEF DESCRIPTION OF THE DRAWING

The accompanying drawings show preferred embodiments of a fuel control system according to the present invention, in which.

DESCRIPTION OF THE PREFERRED EMBODIMENTS

The present invention will now be described with reference to the illustrated embodiments.

Figure 1:
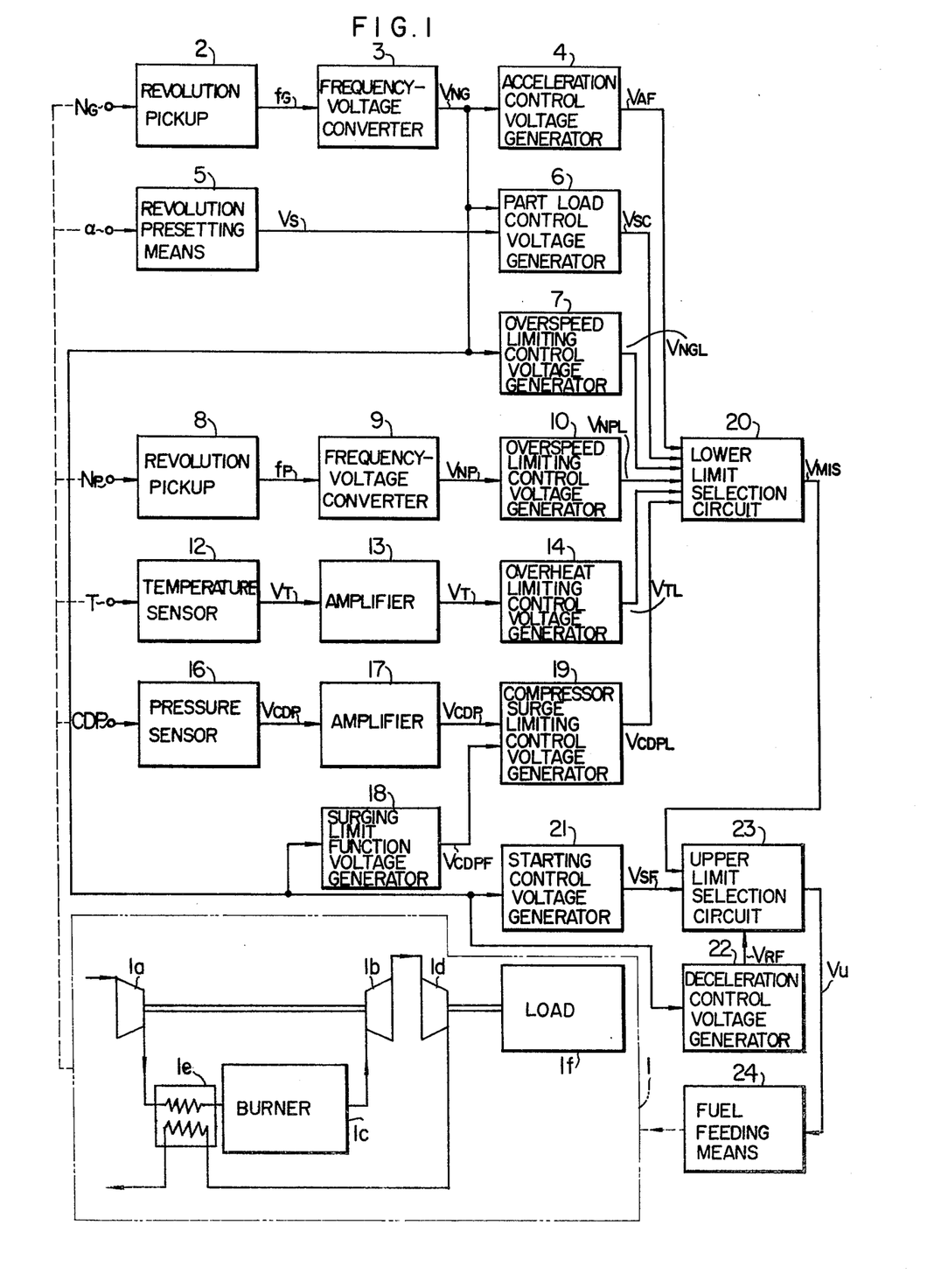
FIG. 1 is a block diagram showing an embodiment of a fuel control system according to the present invention.

FIG. 1 shows an embodiment of a fuel control system of this invention which is used in the operation of a two-shaft gas turbine engine. In FIG. 1, numeral 1 designates a two-shaft gas turbine engine, 1a a compressor, 1b a compressor turbine, 1c a burner, 1d a power turbine, 1e a regenerator, 1f a load. In this embodiment, let it be assumed for purposes of discussion that both the inlet air temperature and inlet air pressure of the compressor 1a are maintained in the normal conditions.

While the amount of heat supplied by the regenerator 1e to the air drawn into the compressor 1a is determined as a function of the air temperature and the air flow rate at the outlet and inlet of the regenerator 1e, in this embodiment, for purposes of the primary approximation, this amount of heat is assumed to be a simple function of only the revolution speed of the compressor turbine 1b and it is preliminarily taken into account in the predetermined fuel feed quantities for the idling and load operating conditions of the engine. Numeral 2 designates a revolution pickup for detecting the revolution speed $N_G$ of the compressor turbine 1b, 3 a frequency-voltage converter for converting the output signal of the revolution pickup 2 into a DC voltage $V_{NG}$ corresponding to a frequency $f_G$ of the pickup output signal, 4 an acceleration control voltage generator for generating an acceleration control voltage $V_{AF}$ which meets a predetermined acceleration fuel feed quantity $q_A$ corresponding to the revolutions $N_G$ of the compressor turbine 1b. Numeral 5 designates revolution presetting means for presetting the revolution speed of the compressor turbine 1b in accordance with the position $\alpha$ of an accelerator pedal, which may include a potentiometer operatively linked to the accelerator pedal to generate a revolution presetting voltage $V_S$ corresponding to the preset revolution speed. Numeral 6 designates a part load control voltage generator whereby in accordance with the revolution presetting voltage $V_S$ a part load control voltage $V_{sc}$ is generated to meet the quantity of fuel required for presetting the revolution speed of the compressor turbine 1b to a given speed in the normal operating range thereof.

Numeral 7 designates an overspeed limiting control voltage generator for the compressor turbine 1b, which generates a compressor turbine overspeed limiting control voltage $V_{NGL}$ for limiting the fuel supply to prevent the revolution speed of the compressor turbine 1b from exceeding the maximum normal revolutions $N_{GM}$.

Numeral 8 designates a revolution pickup for detecting the revolution speed $N_P$ of the power turbine 1d, 9 a frequency-voltage converter for converting the output signal of the revolution pickup 8 to a DC voltage $V_{NP}$ corresponding to a frequency $f_p$ of the pickup output signal, 10 an overspeed limiting control voltage generator for the power turbine 1d, which generates a power turbine overspeed limiting control valve $V_{NPL}$ for limiting the fuel supply to prevent the revolution speed of the power turbine 1d from exceeding the maximum normal revolutions $N_{PM}$.

Numeral 12 designates a temperature sensor which may for example be a C-A thermocouple for generating a temperature signal vT corresponding to the combustion temperature T of the combustion gas, exhaust gas or the like. 13 an amplifier for amplifying the temperature signal vT of the temperature sensor 12 to generate a temperature voltage $V_T$.

Numeral 14 designates an overheat limiting control voltage generator for generating an overheat limiting control voltage $V_{TL}$ for limiting the fuel feed quantity to prevent the temperature T of the combustion gas or exhaust gas from exceeding the maximum allowable temperature $T_M$ which is dependent on the heat resisting properties of the principal component materials of the engine, 16 a pressure sensor for detecting the delivery air pressure of the compressor 1a (hereinafter simply referred to as a CDP), which may for example be a semi-conductor pressure transducer for generating a pressure signal $V_{CDP}$ corresponding to the CDP.

Numeral 17 designates an amplifier for amplifying the pressure signal $V_{CDP}$ from the pressure sensor 16 to generate a pressure voltage $V_{CDP}$, 18 a CDP surging limit function voltage generator of a type designed so that by virtue of the fact that the surging limit of CDP can be determined linearly in accordance with the revolution speed $N_G$ of the compressor turbine 1b a function voltage $V_{CPPF}$ that meets this functional pattern is generated, 19 a compressor surge limiting control voltage generator whereby when the result of a comparison between the CDP voltage $V_{CDP}$ and the function voltage $V_{CDPF}$ indicates that $V_{CDP}$ is greater than $V_{CDPF}$, a compressor surge limiting control voltage $V_{CDPL}$ is generated for limiting the rate of fuel flow to prevent the surging of the compressor 1a.

Numeral 20 designates a lower limit selection circuit for selecting the smallest one of the control voltages $V_{AF}$, $V_{sc}$, $V_{NGL}$, $V_{NPL}$, $V_{TL}$ and $V_{CDPL}$ as an output voltage $V_{MIS}$ and generating a load control signal corresponding to the proper fuel feed quantity under load conditions, 21 a starting control voltage generator for generating a control voltage $V_{sF}$ corresponding to a predetermined starting fuel feed pattern in accordance with the DC voltage $V_{NG}$ corresponding to the revolution speed $N_G$ of the compressor turbine 1b, 22 a deceleration control voltage generator for generating a control voltage $V_{RF}$ corresponding to a fire limiting fuel feeding pattern determined in relation to the speeds $N_G$ of the compressor turbine 1b under deceleration conditions and constituting deceleration control means for generating a deceleration fuel feeding control signal, 23 an upper limit selection circuit for selecting the greatest one of the control voltages $V_{MIS}$, $V_{sF}$ and $V_{RF}$ or a control voltage $V_u$ which determines the final fuel flow rate and generating a fuel control signal for commanding the final fuel feed quantity, 24 fuel feeding means for injecting and feeding the fuel in accordance with the fuel control signal.

The blocks 2 through 20 constitute load control signal generating means for generating a load control signal corresponding to the fuel feed quantity under load conditions, the blocks 21 and 22 constitute idling control signal generating means for generating an idling control signal corresponding to the fuel feed quantity under idling conditions, the block 7 and the blocks 8 through 10 constitute overspeed limiting means for generating a fuel limiting control signal for separately limiting the revolution speed of each of the compressor turbine 1b and the power turbine 1d to the maximum revolution speed, the blocks 16 through 19 constitute surge limiting means for comparing a pressure signal corresponding to the delivery pressure of the compressor 1a and a predetermined surging limit value corresponding to the revolution speed of the compressor turbine 1b and generating a fuel limiting control signal, and the blocks 12 through 14 constitute overheat limiting means whereby in accordance with a temperature signal corresponding to the combustion temperature a fuel limiting control signal is generated which limits the combustion temperature to the heat resisting limit temperature of the gas turbine engine 1.

Figure 2:
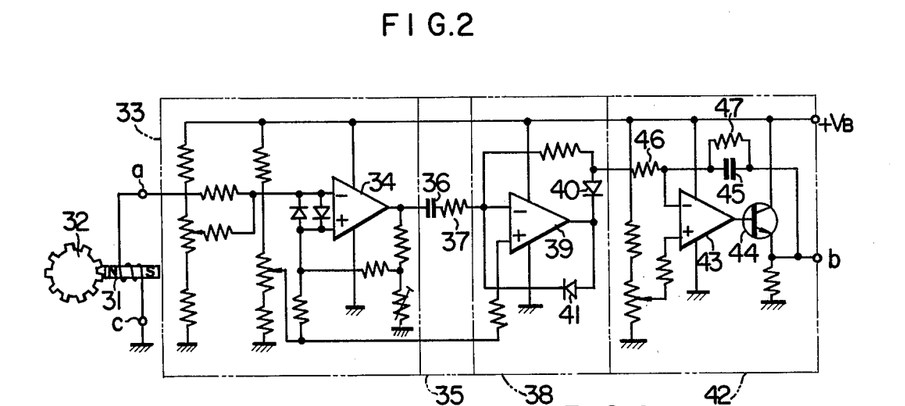
FIG. 2 is a circuit diagram of the frequency-voltage converter used in the embodiment of FIG. 1.
Figure 3:
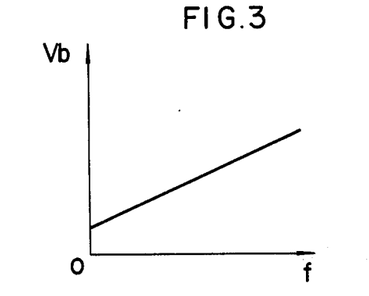
FIG. 3 is an input-output characteristic diagram of the frequency-voltage converter shown in FIG. 2.

The individual component elements of the embodiment constructed as described above will now be described in greater detail with reference to the corresponding circuit diagrams illustrated in the drawings. FIG. 2 illustrates a circuit diagram of the frequency-voltage converter 3 or 9 for generating a DC speed voltage corresponding to the revolution speed of the compressor turbine 1b or the power turbine 1d. In FIG. 2, numeral 31 designates an electromagnetic pickup which corresponds to the revolution pickup 2 or 8 shown in the block diagram of FIG. 1. Numeral 32 designates an inductor which rotates in association with the rotating shaft of the compressor turbine 1b or the power turbine 1d. Consequently, an AC signal having a frequency corresponding to the revolution speed of the compressor turbine 1b or the power turbine 1d is generated across terminals a and c in FIG. 2. Numeral 33 designates a Schmitt circuit including a differential operational amplifier 34 and adapted for reshaping the AC signal generated from the electromagnetic pickup 31 into a rectangular waveform, 35 a differentiation circuit for converting the reshaped rectangular waveform into a pulse waveform having a predetermined area whose differential constant is preset by a capacitor 36 and a resistor 37. Numeral 38 designates a half-wave rectifier circuit including an operational amplifier 39 and diodes 40 and 41 for subjecting the output pulse voltage of the differentiation circuit 35 to half-wave rectification to generate only negative polarity pulses, 42 a smoothing circuit including a differential operational amplifier 43, 44 a buffering transistor. The time constant of the smoothing circuit 42 is preset by a capacitor 45 and resistors 46 and 47 so that a voltage $V_b$ generated at an output terminal b of the smoothing circuit 42 is a DC voltage proportional to a frequency f of the output signal of the electromagnetic pickup 31 and having the characteristic shown in FIG. 3. In operation, the rotation of the inductor 32 operatively associated with the rotating shaft of the compressor turbine 1b or the power turbine 1d is detected by the revolution pickup 2 or 8, so that the frequency-voltage converters 3 and 9 each having the same circuit construction as shown in FIG. 2 respectively generate speed voltages $V_{NG}$ and $V_{NP}$ respectively corresponding to the revolutions $N_G$ and $N_p$ of the compressor turbine 1b and the power turbine 1d.

Figure 4:
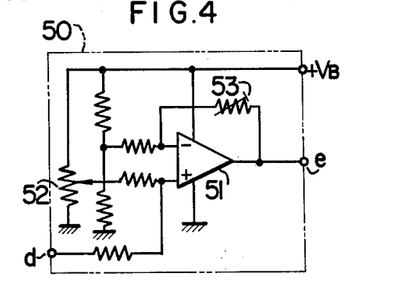
FIG. 4 is a circuit diagram of the linear incremental function voltage generator used in the embodiment of FIG. 1.
Figure 5:
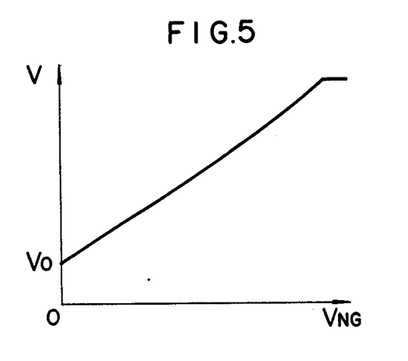
FIG. 5 is an input-output characteristic diagram of the function voltage generator shown in FIG. 4.

Next, the acceleration control voltage generator 4 will be described with reference to FIGS. 4 through 8. In FIG. 7 showing a characteristic diagram of the acceleration control voltage, the dash-and-dot line indicates an acceleration fuel pattern which determines acceleration fuel quantities fed to the gas turbine engine 1, and the fuel feed quantities are indicated in terms of voltages at a predetermined ratio. While this acceleration fuel pattern is represented by the curve connecting three points A, B and C, it will be described by taking as an example a function voltage generator which tangentially approximates the curve with two straight lines $\overline{AB}$ and $\overline{BC}$. Referring first to FIG. 4 illustrating a circuit diagram of a linear incremental function voltage generator 50, numeral 51 designates a differential operational amplifier in which the speed voltage $V_{NG}$ of the compressor turbine 1b is applied to a non-inverting input terminal d and the output voltage generated at an output terminal e is a linear incremental function voltage which increases to the right. The slope of this straight line is presettable by a gain adjusting variable resistor 53, and a bias voltage $V_o$ is also presettable as desired by a variable resistor 52. Consequently, by adjusting the setting of the variable resistors 52 and 53, it is possible to realize the straight line $\overline{AB}$ drawn through the points A and B or the straight line $\overline{BC}$ drawn through the points B and C in FIG. 7.

Figure 6:
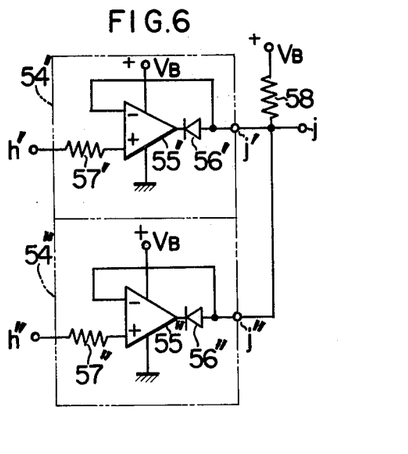
FIG. 6 is a circuit diagram of the lower limit selection circuit used in the embodiment of FIG. 1.
Figure 7:
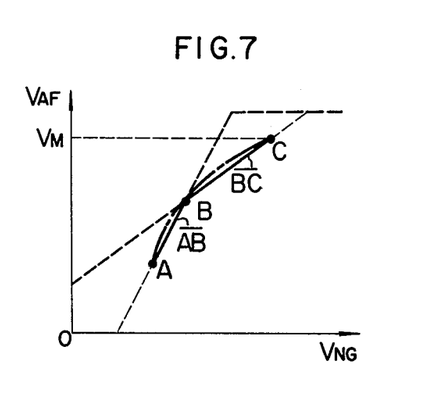
FIG. 7 is a characteristic diagram of the acceleration control voltage in the system of this invention.

FIG. 6 shows an embodiment of the lower limit selection circuit which is constructed so that the smaller one of its two inputs is always selected at its output voltage, and unit circuits 54' and 54'' respectively connected to input terminals h' and h'' are of the same circuit construction. Numerals 55' and 55'' designate differential operational amplifiers, 56' and 56'' diodes, 57' and 57'' resistors, j' and j'' the output terminal of the unit circuits 54' and 54''. The output terminals j' and j'' are connected to a common load resistor 58 and a common output terminal j. The other end of the common load resistor 58 is connected to a positive terminal $V_B +$ of a power supply. The output voltages of the operational amplifiers 55' and 55'' are respectively coupled to the output terminals j' and j'' through the diodes 56' and 56'' and each of the output voltages is fed back as an inverting input with a gain of unity. Consequently, the smaller one of the input voltages applied to the input terminals h' and h'' is always selected.

On the other hand, it is possible to provide as many units of the basic circuit 54' shown in FIG. 6 as there are input signals and connect the respective output terminals of the basic circuits to a common load resistance to thereby select the smallest voltage of all the input signals as an output voltage.

Figure 8:
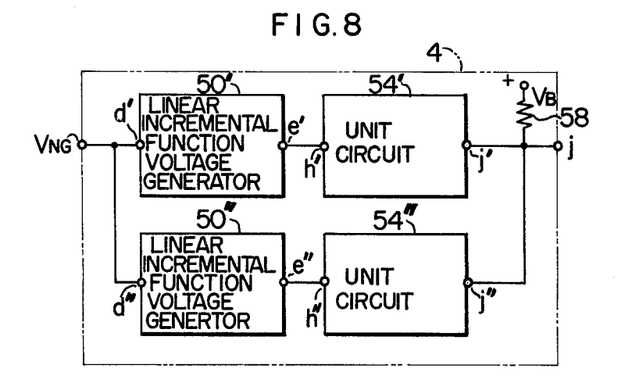
FIG. 8 is a block diagram of the acceleration control voltage generator used in the embodiment of FIG. 1.

Consequently, by combining two units of the linear incremental function voltage generator shown in FIG. 4 and the lower limit selection circuit shown in FIG. 6 together, it is possible to generate an acceleration control voltage by a tangential approximation as shown by the solid line drawn through the three points A, B and C in FIG. 7, and the resulting acceleration control voltage generator 4 is shown in FIG. 8. In FIG. 8, numerals 50' and 50'' designate linear incremental function voltage generator of the same circuit construction as shown in FIG. 4, while numerals 54' and 54'' designate circuits of the same construction as the unit circuits 54' and 54'' of the lower limit selection circuit shown in FIG. 6. The compressor turbine speed voltage $V_{NG}$ is applied to the respective input terminals d' and d'' of the function voltage generators 50' and 50'' whose output terminals e' and e'' are connected respectively to the input terminals h' and h'' of the unit circuits 54' and 54'' in the lower limit selection circuit. The lower limit selection circuit includes a common load resistor 58 and a common output terminal j which are connected to the respective output terminals j' and j'' of the unit circuits 54' and 54''. The gains and bias voltages of the function voltage generators 50' and 50'' are preset so that their resulting characteristic curves pass respectively the points A and B and the points B and C as shown by the straight lines $\overline{AB}$ and $\overline{BC}$ in FIG. 7. Since the lower one of the output voltages of the function voltage generators 50' and 50'' is selected by the lower limit selection circuit as its output voltage, the output voltage generated at the common output terminal j is a tangential approximation of the acceleration fuel pattern shown by the solid line passing through the points A, B and C in FIG. 7 thus generating the acceleration control voltage $V_{AF}$. By further increasing the number of the function voltage generators and the lower limit selection circuit, respectively, it is possible to divide the acceleration fuel pattern into an increased number of segments and obtain the resulting tangentially approximated acceleration control voltage with an improved accuracy of approximation.

Figure 9:
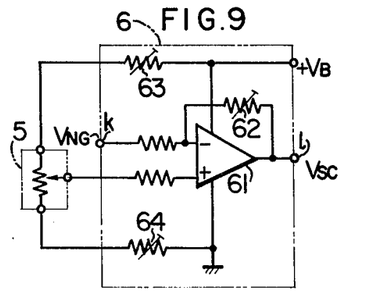
FIG. 9 is a circuit diagram of the part load control voltage generator used in the embodiment of FIG. 1.
Figure 10:
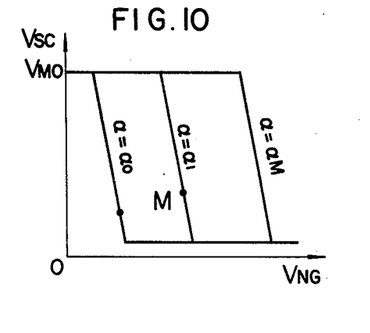
FIG. 10 is a characteristic diagram of the part load control voltage generated by the circuit of FIG. 9.

FIG. 9 illustrates a circuit diagram showing an embodiment of the part load control voltage generator 6. In FIG. 9, numeral 5 designates the revolution presetting means including a potentiometer for detecting the position of an acelerator pedal, and in the case of an automobile gas turbine engine the revolution presetting means 5 is operated in association with the movement of the accelerator pedal. In the part load control voltage generator 6, numeral 61 designates a differential operational amplifier wherein the compressor turbine speed voltage $V_{NG}$ is applied as an inverting input signal to an input terminal K and a revolution presetting voltage Vs corresponding to the position of the accelerator pedal and generated from the accelerator position detecting revolution presetting means 5 is received as a noninverting input signal. FIG. 10 shows voltage patterns for the output voltage generated at an output terminal l, and the part load control voltage $V_{sc}$ may be preset as desired by adjusting the accelerator position $\alpha$. Numeral 62 designates a gain setting variable resistor, 63 and 64 bias setting variable resistors. In the characteristic diagram of FIG. 10, $\alpha = \alpha_M$ represents the wide open accelerator position, $\alpha = \alpha_o$ represents the fully closed accelerator position and $\alpha = \alpha_1$ represents an accelerator position corresponding to $\alpha_0 < \alpha_1 < \alpha_m$.

Figure 11:
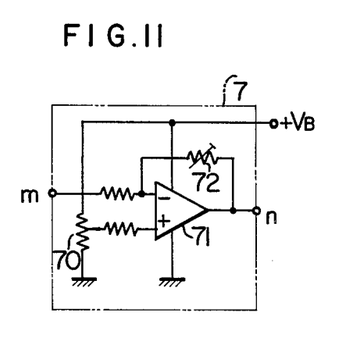
FIG. 11 is a circuit diagram of the compressor turbine overspeed limiting control voltage generator used in the embodiment of FIG. 1.
Figure 12:
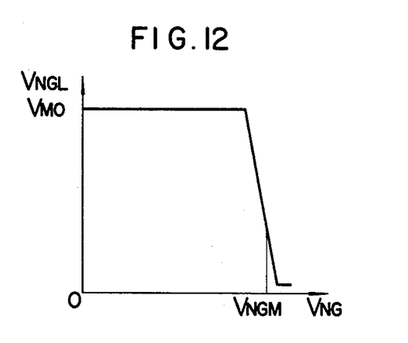
FIG. 12 is a characteristic diagram of the compressor turbine overspeed limiting control voltage used in the system of this invention.

In FIG. 11 illustrating a circuit diagram of the compressor turbine overspeed limiting control voltage generator 7, numeral 70 designates a revolution presetting potentiometer which is set by a speed voltage $V_{NGM}$ corresponding to the maximum normal revolutions $N_{GM}$ of the compressor turbine 1b, 71 a differential operational amplifier, 72 a gain setting variable resistor. The compressor turbine speed voltage $V_{NG}$ is applied to an inverting input terminal m as the inverting input signal of the differential operational amplifier 71 and the presetting voltage $V_{NGM}$ of the potentiometer 70 is received as a non-inverting signal thus generating at an output terminal n the compressor turbine overspeed limiting control voltage $V_{NGL}$ having a pattern as shown in FIG. 12.

Figure 13:
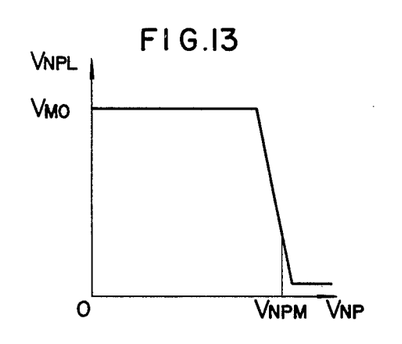
FIG. 13 is a characteristic diagram of the power turbine overspeed limiting control voltage used in the system of this invention.

The power turbine overspeed limiting control voltage generator 10 is basically of the same construction as the compressor turbine overspeed limiting control voltage generator 7 of FIG. 11 except that the setting of the revolution setting potentiometer 70 is determined by a speed voltage $V_{NPM}$ corresponding to the maximum normal revolutions $N_{PM}$ of the power turbine 1d and the power turbine speed voltage $V_{PN}$ is applied to the inverting input terminal m as the inverting input signal to the operational amplifier 71, thus generating at the output terminal n the power turine overspeed limiting control voltage $V_{NPL}$ shown by the characteristic diagram of FIG. 13.

Figure 14:
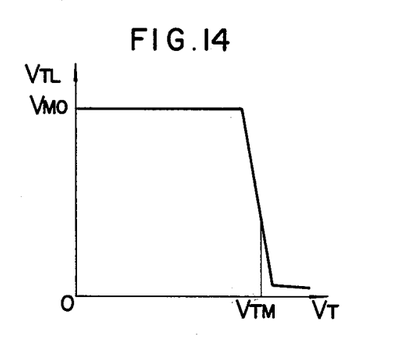
FIG. 14 is a characteristic diagram of the overheat limiting control voltage used in the system of this invention.
Figure 15:
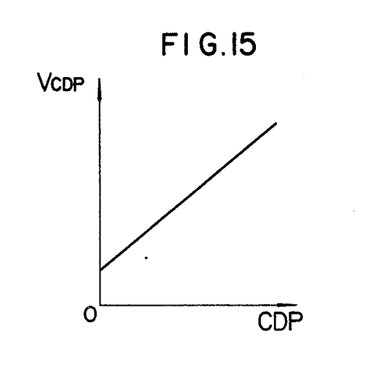
FIG. 15 is a characteristic diagram of the pressure voltage used in the system of this invention.

Next, the overheat limiting control voltage generator 14 will be described. The combustion temperature T such as the combustion gas temperature or the exhaust gas temperature of the gas turbine engine 1 is detected as the temperature signal vT by the temperature sensor 12 including for example a thermocouple, so that the temperature signal vT is amplified by the amplifier 13 with a predetermined amplification factor and the temperature voltage $V_T$ corresponding to the combustion temperature T is generated. This temperature voltage $V_T$ is applied as the input signal to the overheat limiting control voltage generator 14. The overheat limiting control voltage generator 14 is identical in circuit construction with the circuit shown in FIG. 11 except that the temperature voltage $V_T$ is applied to the inverting input terminal m, and the potentiometer 70 for determining the non-inverting input signal is preset by a temperature signal $V_{TM}$ corresponding to the maximum normal temperature $T_M$ of the combustion gas or exhaust gas. In this case, the output voltage generated at the output terminal n is the overheat limiting control voltage $V_{TL}$ shown by the characteristic diagram of FIG. 14.

Figure 16:
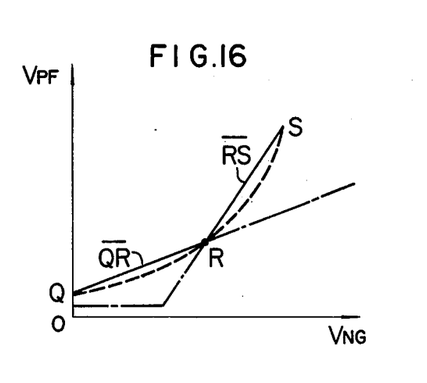
FIG. 16 is a surging limit characteristic diagram for the system of this invention.
Figure 17:
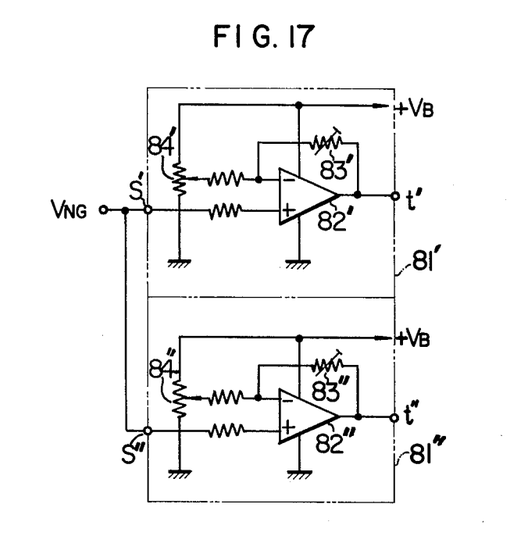
FIG. 17 is a circuit diagram of the linear incremental function voltage generator used in the embodiment of FIG. 1.
Figure 18:
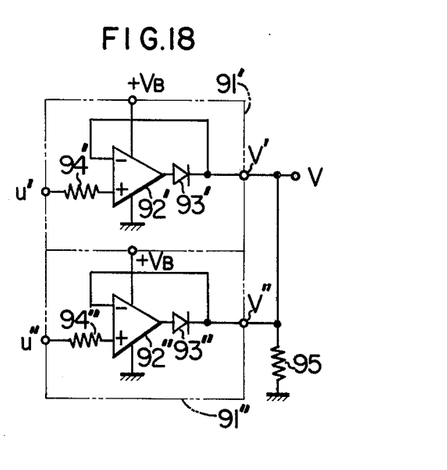
FIG. 18 is a circuit diagram of the upper limit selection circuit used in the embodiment of FIG. 1.
Figure 19:
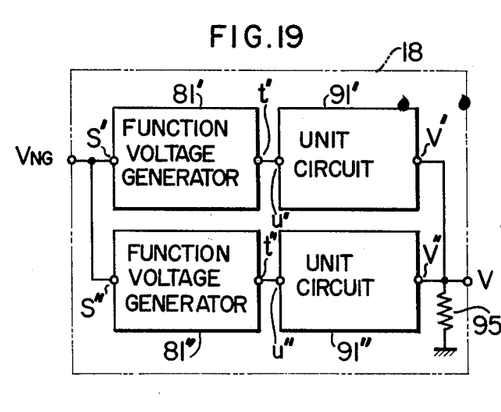
FIG. 19 is a block diagram of the surging limit function voltage generator used in the embodiment of FIG. 1.
Figure 20:
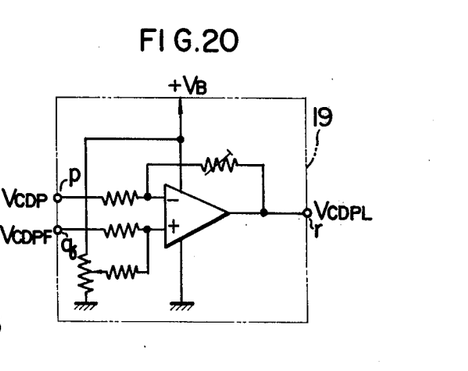
FIG. 20 is a circuit diagram of the surge limiting control voltage generator used in the embodiment of FIG. 1.

Next, the surge limiting means for the compressor 1a will be described with reference to FIGS. 15 through 21. In the illustrated embodiment, the pressure sensor 16 including for example a semiconductor type pressure transducer converts CDP into a pressure signal vCDP which is in turn amplified by the amplifier 17 to generate the pressure voltage $V_{CDP}$ shown in FIG. 15. On the other hand, the surging limit values of CDP are at least experimentally preliminarily measured and determined over the range of normal speeds of the compressor 1a. In other words, in FIG. 16 the dotted line represents the surging limit values of CDP in terms of the voltages and it is a curve passing through three points Q, R and S. This surging limit curve will be described by way of example with reference to the surging limit function voltage generator 18 which tangentially approximates the surging limit curve with two straight lines $\overline{QR}$ and $\overline{RS}$. FIG. 17 illustrates a circuit diagram showing an embodiment of a linear incremental function voltage generator, in which function voltage generators 81' and 82" respectively generate the function voltages represented by the two lines $\overline{QR}$ and $\overline{RS}$ respectively passing through the points Q and R and the points R and S in FIG. 16. Numerals 82' and 82" designate differential operational amplifiers, s' and s" input terminals, t' and t" output terminals, 83' and 83" gain setting variable resistors, 84' and 84" bias setting variable resistors. The compressor turbine speed voltage $V_{NG}$ is applied to the input terminals s' and s" so that by adjusting the gains and biases the output voltages generated at the output terminals t' and t" take the form of the linear incremental function voltages respectively shown by the straight lines $\overline{QR}$ and $\overline{RS}$ shown in FIG. 16. In FIG. 18, there is illustrated a circuit diagram for an embodiment of an upper limit selection circuit wherein the greater one of two input voltages is always selected as an output voltage. Unit circuits 91' and 92" are arranged to be respectively associated with input terminals u' and u". The unit circuits 91' and 92" are of the identical circuit construction. Numerals 92' and 92" designate differential operational amplifiers, 93' and 93" diodes, 94', 94" and 95 resistors, v' and v" the output terminals of the unit circuits 91' and 91". The output terminals v' and v" are connected to one end of the common load resistor 95 and a common output terminal v. The other end of the common load resistor 95 is grounded. The output signals of the operational amplifiers 92' and 92" are applied to the resistor 95 through the diodes 93' and 93" and are also fed back to the associated inverting inputs with a gain of unity. Consequently, the greater one of the input voltages applied to the two input terminals u' and u" is selected and generated as an output voltage at the output terminal v. To construct an upper limit selection circuit which selects the greatest one of three or more input voltages, it is only necessary to arrange as many units of the circuit of the identical construction as the unit circuit 91' as there are the input voltages and connect these circuits to the common load resistor 95. FIG. 19 illustrates the surging limit function voltage generator 18 comprising in combination the linear incremental function voltage generators 81' and 82" shown in FIG. 17 and the upper limit selection circuit shown in FIG. 18 and adapted to tangentially approximate with two straight lines the CDP surging limit pattern shown by the solid line in FIG. 16. In FIG. 19, numerals 81' and 81" designate the linear incremental function voltage generators shown in FIG. 17, 91' and 92" the unit circuits of the upper limit selection circuit shown in FIG. 18. The compressor turbine speed voltage $V_{NG}$ is applied to the input terminals s' and s" of the function voltage generators 81' and 81". The output terminals t' and t" of the function voltage generators 81' and 81" are respectively connected to the input terminals u' and u", so that the greatest one of the output voltages of the function voltage generators 81' and 81" is selected by the upper limit selection circuit and thus the function pattern obtained by tangentially approximating the surging limit pattern with two linear incremental function voltages as shown by the solid line in FIG. 16 is generated at the output terminal v.

Figure 21:
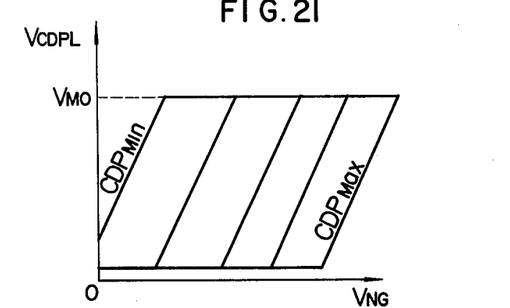
FIG. 21 is a characteristic diagram of the surge limiting control voltage used in the system of this invention.

In this case, by increasing the number of the function voltage generator and the unit circuit in the upper limit selection circuit to tangentially approximate the surging limit pattern with an increased number of linear incremental function voltages, it is possible to ensure an improved accurary of approximation. The surging limit function voltage $V_{CDP}$ which is generated from the surging limit function voltage generator 18 of FIG. 19 and the pressure voltage $V_{CDP}$ generated from the amplifier 17 are respectively applied to input terminals p and q of the surge limiting control voltage generator 19 shown in FIG. 20 and including a comparator, and the two input voltages are compared thus generating at an output terminal r the surge limiting control voltage $V_{CDPL}$ shown by the characteristic diagram of FIG. 21. The parameter of the characteristic diagram of FIG. 21 is the CDP.

Figure 22:
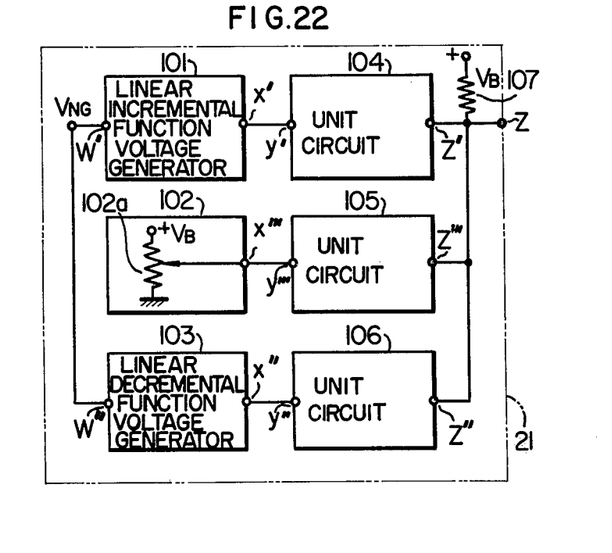
FIG. 22 is a block diagram of the starting control voltage generator used in the embodiment of FIG. 1.
Figure 23:
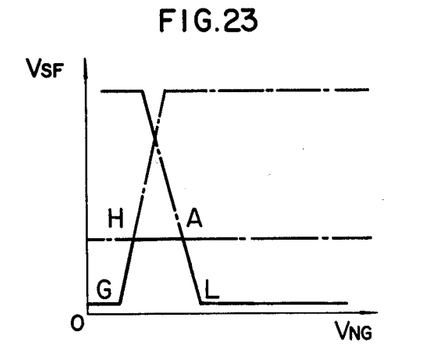
FIG. 23 is a characteristic diagram of the starting control voltage used in the system of this invention.

FIG. 22 shows a circuit construction of the starting control voltage generator 21 for generating a starting control voltage corresponding to a starting fuel curve. In FIG. 22, numeral 101 designates a linear incremental function voltage generator of the identical construction with the circuit 81' shown in FIG. 17, wherein the compressor turbine speed voltage $V_{NG}$ is applied to an input terminal w' and a linear incremental function voltage shown by the curve passing through points G and H in FIG. 23 is generated at an output terminal x'. Numeral 103 designates a linear decremental function voltage generator of the same construction as the overspeed limiting control voltage generator 7 shown in FIG. 11, in which the speed voltage $V_{NG}$ is applied to an input terminal w" and a linear decremental function voltage shown by the curve passing through points A and L in FIG. 23 is generated at an output terminal x". Numeral 102 designates a function voltage generator for generating a flat voltage, which includes a potentiometer 102a for generating at an output terminal x'" a constant voltage passing points H and A in FIG. 23. Numerals 104, 105 and 106 designate unit circuits of the same construction as the unit circuit 54' in the upper limit selection circuit shown in FIG. 6 with the respective output terminals z', z" and z'" connected to a common load resistor 107 and a common output terminal z. With this construction, the output voltage generated at the common output terminal z is the function voltage shown by the solid line in FIG. 23 or starting control voltage $V_{sF}$.

Figure 24:
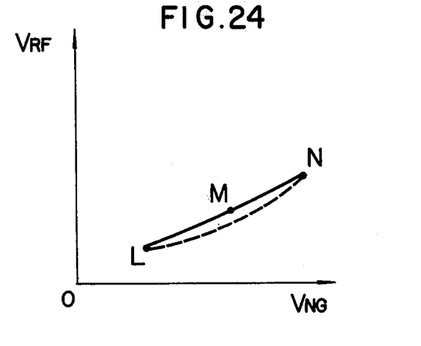
FIG. 24 is a characteristic diagram of the deceleration control voltage used in the system of this invention.

On the other hand, to generate the deceleration control voltages $V_{RF}$ which are predetermined in accordance with the fire limiting fuel feed quantities of the gas turbine engine 1 as shown in FIG. 24, the deceleration control voltage generator 22 employs circuits of the same construction as the linear incremental function voltage generator 81' shown in FIG. 17 to approximate the function with the straight line passing through points L, M and N in FIG. 24.

Figure 25:
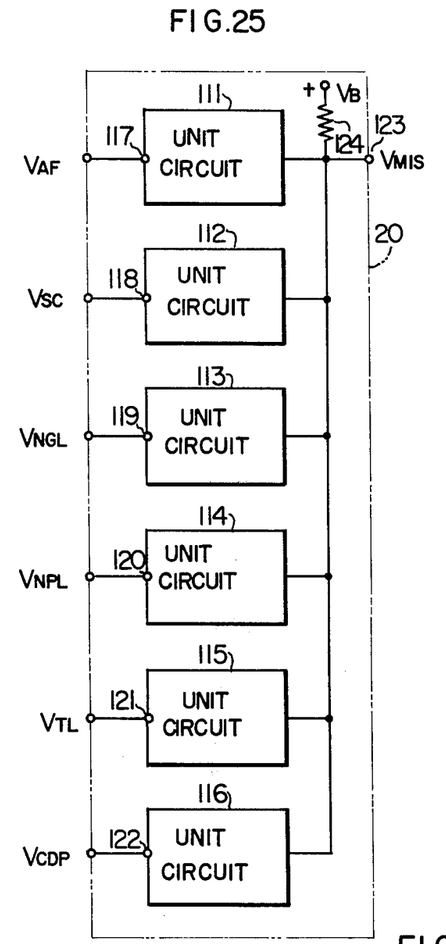
FIG. 25 is a block diagram of the lower limit selection circuit used in the embodiment of FIG. 1.

The lower limit selection circuit 20 is constructed as shown in FIG. 25, wherein numerals 111 through 116 designate circuits of the same construction as the unit circuit 51' shown in FIG. 6, and input terminals 117 through 122 respectively receive the acceleration control voltage $V_{AF}$, the part load control voltage $V_{sc}$, the compressor turbine overspeed limiting control voltage $V_{NGL}$, the power turbine overspeed limiting control voltage $V_{NPL}$, the overheat limiting control voltage $V_{TL}$ and the surge limiting control voltage $V_{CDPL}$. The unit circuits 111 through 116 are connected to a common output terminal 123 and a common load resistor 124, so that the smallest one of all the applied voltages at the input terminals 117 through 122 is selected as the load control voltage $V_{MIs}$ under load conditions.

Figure 26:
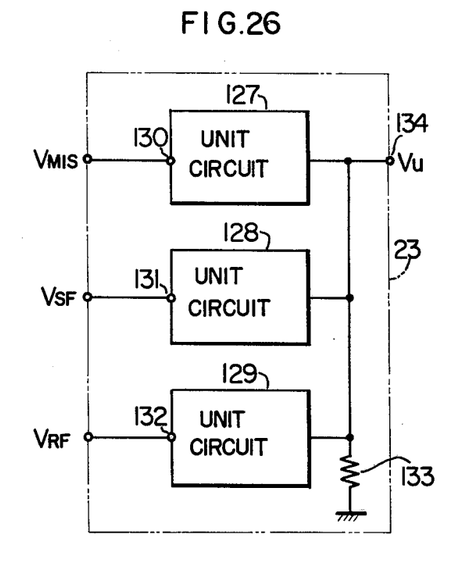
FIG. 26 is a block diagram of the upper limit selection circuit used in the embodiment of FIG. 1.
Figure 27:
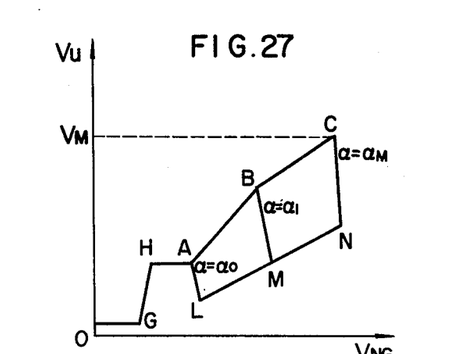
FIG. 27 is a characteristic diagram of the fuel control voltage used in the system of this invention.

The upper limit selection circuit 23 is constructed as shown in FIG. 26, in which numerals 127, 128 and 129 designate unit circuits of the same construction as the unit circuit 91' shown in FIG. 18, and input terminals 130, 131 and 132 respectively receive the load control voltage $V_{MIs}$ generated from the lower limit selection circuit 20, the starting control voltage $V_{sF}$ and the deceleration control voltage $V_{RF}$. Numeral 133 designates a common load resistor, 134 a common output terminal. The fuel control voltage $V_u$ for commanding the final fuel feed quantity corresponding to the operating conditions including load and idling conditions is generated at the output terminal 134. Consequently, the fuel control voltage $V_u$ has the voltage pattern shown in FIG. 27. In FIG. 27, however, it is assumed that the power turbine overspeed limiting control voltage $V_{NPL}$, the overheat limiting control voltage $V_{TL}$ and the surge limiting control voltage $V_{CDPL}$ are all outside the range of limit values and these output voltages are all in the state of $V_{Mo}$ ($V_{Mo} > V_M$). The parameter for the pattern of the control voltage $V_u$ shown in FIG. 27 is the accelerator position $\alpha$, so that when $\alpha = \alpha_0$ (minimum) the tangential function voltage curve passing through points G, H, A, L, M and N is obtained, when $\alpha = \alpha_1$ ($\alpha_0 < \alpha_1 < \alpha_M$) the tangential functional voltage curve passing through the points G, H, A, B, M and N is obtained, and when $\alpha = \alpha_M$ (maximum) the tangential function voltage curve passing the points G, H, A, B, C and N is obtained.

It will thus be seen from the foregoing description that by causing the fuel feeding means 24 to operate and feed fuel in accordance with the fuel control voltage $V_u$ which determines the final fuel feed quantity of the gas turbine engine 1, it is possible in any given speed range between the idling speed and the maximum normal speed of the gas turbine engine 1 to control the acceleration, deceleration and part load operations of the engine and ensure the proper starting fuel supply, and moreover it is possible to accomplish all of the overspeed limitation for both the compressor turbine 1b and the power turbine 1d, the overheat limitation, the limitation of surge due to CDP, etc., by reflecting these limitations in the rate of fuel flow.

Figure 28:
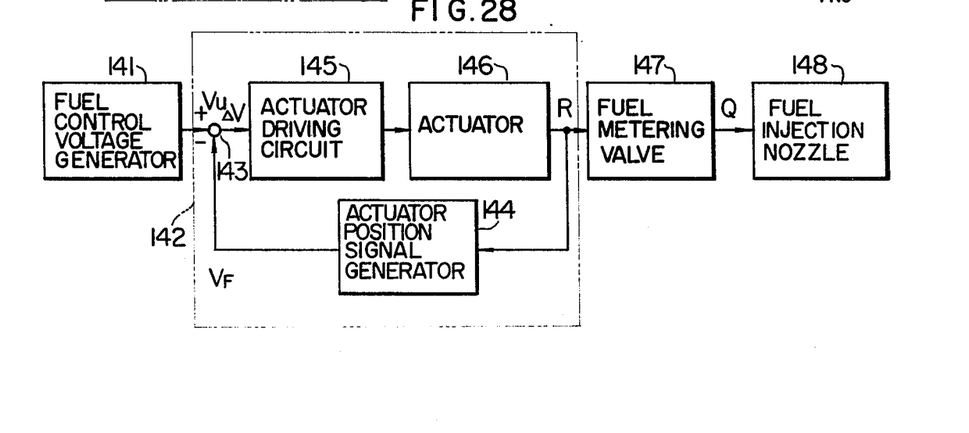
FIG. 28 is a block diagram of a fuel feed system incorporating the system of this invention.

FIG. 28 is a block diagram showing an exemplary form of a gas turbine engine fuel feed system adapted to use the fuel control voltage $V_u$. In this system, a fuel metering valve is operated by a positioning servo motor 142 to control the quantity of fuel fed to the engine, and the control voltage $V_u$ generated from the device of this invention is used to determine the desired position of the servo motor 142. In FIG. 28, numeral 141 designates the device for generating the control voltage $V_u$ of the invention. Numeral 144 designates an actuator position signal generator, 143 a comparator, 145 an actuator driving circuit, 146 an actuator, 147 a fuel metering valve. The actuator 146 is adapted to actuate the control lever of the fuel metering valve 147 in accordance with the driving output of the actuator driving circuit 145, and the quantity of fuel fed to a fuel injection nozzle 148 mounted on the burner 1c of the gas turbine engine 1 is controlled in accordance with the movement of the control lever of the fuel metering valve 147. Consequently, since the rate of fuel flow to the gas turbine engine 1 is determined by detecting the displacement of the actuator 146, the displacement of the actuator 146 is converted into a voltage by the actuator position signal generator 144 thus generating a position signal $V_F$. This position signal is compared with the control voltage $V_u$ generated from the control voltage generating device 141 in the comparator 143, so that an error $\Delta V$ between the actual rate of fuel flow to the gas turbine 1 and the predetermined rate of fuel flow is detected and the actuator driving circuit 145 generates a driving output for the actuator 146, thus automatically controlling the rate of fuel flow by using the predetermined value corresponding to the control voltage $V_u$ as the desired value.

Figure 29:
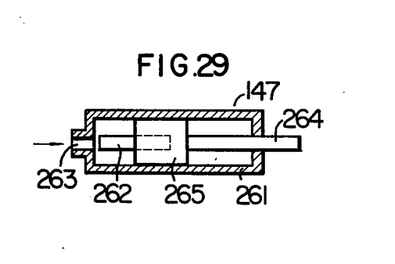
FIG. 29 is a partial sectional view of the metering valve used in the fuel feed system of FIG. 28.
Figure 30:
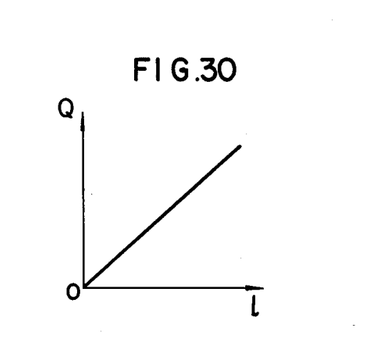
FIG. 30 is a characteristic diagram of the metering valve shown in FIG. 29.

FIG. 29 is a partial sectional view showing an exemplary construction of the fuel metering valve 147 shown in FIG. 28, in which a rectangular slit 262 is formed in a portion of a cylinder 261 so that the fuel fed into the cylinder 261 through a fuel inlet port 263 is supplied to a fuel outlet through the slit 262 and the fuel is further supplied to the fuel injection nozzle 148 mounted on the burner 1c of the gas turbine engine 1. It is assumed that the differential pressure between the fuel pressure at the fuel inlet 263 and that at the fuel outlet is maintained constant by a pressure regulator. A piston 265 which is fitted oiltight in the cylinder 261 is movable in either direction in response to the operation of a control lever 264, and the effective area of the flow path of the slit 262 is varied in accordance with the movement of the piston 265. Consequently, the rate of fuel flow Q can be determined in proportion to the movement 1 of the control lever in accordance with the characteristic diagram of FIG. 30.

Figure 31:
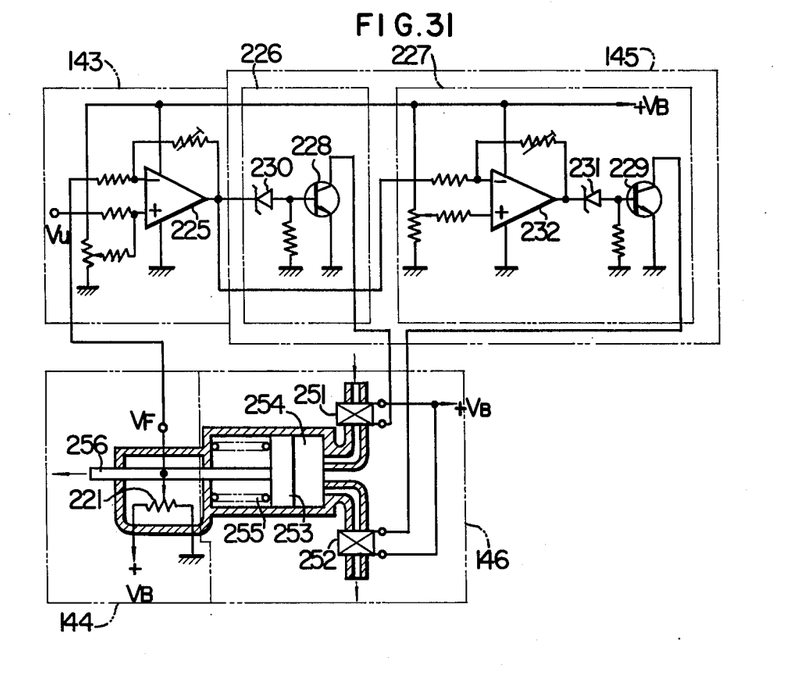
FIG. 31 is a detailed circuit diagram of the principal parts of the fuel feed system shown in FIG. 28.

FIG. 31 illustrates another modified form of the fuel feed system of FIG. 28, in which the servo motor 142 is a solenoid valve-controlled fluid actuator and the comparator 143 includes a differential operational amplifier 225 to detect an error signal $\Delta V_u = V_u - V_F$ between the control voltage $V_u$ and the actuator position signal $V_F$. The actuator driving circuit 145 is circuitry whereby when an error voltage $\Delta V$ becomes greater than a predetermined upper threshold $\delta$ or becomes lower than a predetermined lower threshold $-\delta$, a valve actuating voltage is generated to open a solenoid valve 251 or 252 (where ±δ is a neutral zone), and valve driving circuits 226 and 227 are arranged to respectively cooperate with the fuel inlet solenoid valve 251 and the fuel exhaust solenoid valve 252. In the valve driving circuits 226 and 227, numerals 228 and 229 designate transistors, 230 and 231 Zener diodes, 232 a differential operational amplifier. The actuator 146 include the fuel inlet solenoid valve 251 and the fuel exhaust solenoid valve 252 which are arranged in the respective passages leading respectively from a high pressure fluid source and a low pressure fluid source to a fluid chamber 254 including a movable wall 253 to control the amount of fluid flowing into and out of the fluid chamber 254 and thereby to control the movement of the actuator. The position of the movable wall 253 is determined in accordance with the balance of force between the force of the fluid pressure acting on the movable wall 253 and the restoring force of a spring 255 so that the driving force is taken by a connecting rod 256 to operate the control lever 264 of the fuel metering valve 147 and at the same time a potentiometer 221 of the position signal generator 144 is operatively associated with the control lever 264 to generate and negatively feed back to the comparator 143 the signal $V_F$ corresponding to the position of the control lever 264. Consequently, when the actual rate of fuel flow detected in terms of the position signal $V_F$ becomes lower than a predetermined rate of fuel flow corresponding to the control voltage $V_u$ thus causing a condition $\Delta V < \delta$, the fuel inlet solenoid valve 251 is opened and the fuel exhaust solenoid valve 252 is closed. Consequently, in response to the working fluid introduced into the fluid chamber 254 from the high pressure fluid source the movable wall 253 is moved to the left with the result that the control lever 264 of the fuel metering valve 147 is moved in a direction that increases the rate of fuel flow and the actuator position signal $V_F$ is also increased to approach the control voltage $V_u$ thus causing the actual rate of fuel flow to approach the predetermined rate of fuel flow. When a condition $|\Delta V| \leq \delta$ is eventually established, the two solenoid valves 251 and 252 are closed and the movable wall 253 is brought to a rest. On the other hand, when the actual fuel flow rate exceeds the predetermined fuel flow rate so that there exists a condition $\Delta V > \delta$, the solenoid valve 252 is opened and the solenoid valve 251 is closed thus causing the working fluid in the fluid chamber 254 to flow out to the low pressure fluid source and thereby to allow the force of the spring 255 to overcome the force due to the fluid pressure in the fluid chamber 254. Consequently, the movable wall 253 is moved to the right with the result that the control lever 264 of the fuel metering valve 147 is moved in a direction that decreases the rate of fuel flow and the actuator position signal $V_F$ is also decreased to approach the fuel control voltage $V_u$ thus establishing the condition $|\Delta V| \leq \delta$ and thereby causing the movable wall 253 to come to a rest.

Figure 32:
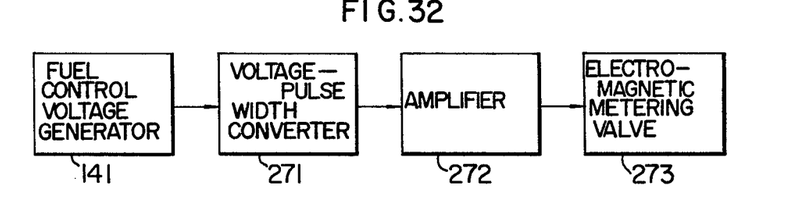
FIG. 32 is a block diagram showing another embodiment of the fuel feed system.
Figure 33:
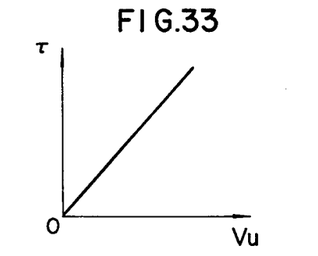
FIG. 33 is a characteristic diagram of the voltage-pulse width converter used in the fuel feed system shown in FIG. 32.
Figure 34:
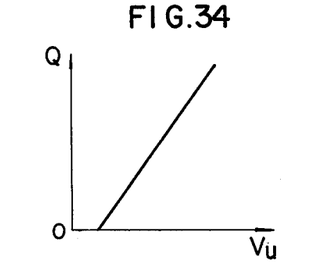
FIG. 34 is a characteristic diagram of the electromagnetic valve used in the fuel feed system of FIG. 32.

FIG. 32 is a block diagram showing another form of a gas turbine engine fuel feed system incorporating the device of this invention, wherein the control voltage $V_u$ generated from the control voltage generating device 141 is converted through a $V-\tau$ converter 271 into the time width of a pulse voltage (the repetition period is fixed) and the duration of the opening of an electromagnetic metering valve is determined in accordance with the pulse voltage to control the quantity of fuel fed. In FIG. 32, in accordance with the control voltage $V_u$ generated from the control voltage generating device 141 the voltage-pulse width converter 271 is controlled for accomplishing the required voltage-pulse width conversion, so that timing pulses (the pulse repetition period is fixed) having a time width $\tau$ proportional to the control voltage $V_u$ as shown in FIG. 33 are generated and the timing pulse is applied, after amplification by an amplifier 272, to the exciting coil of an electromagnetic metering valve 273. The electromagnetic metering valve 273 is a quick response electromagnetically operated valve which is capable of opening and closing in response to the pulse voltages, so that the valve 273 is opened for the duration of the time width $\tau$ of the timing pulses thus opening the fuel passage to flow the fuel therethrough, whereas when no timing pulse is applied to the valve 273 the fuel passage is blocked to prevent the passage of fuel therethrough. The difference in fuel pressure between the inlet and outlet of the electromagnetic metering valve 273 is maintained at a predetermined value by a pressure regulator, and the time average value of the amount of fuel flow through the valve 273 is proportional to the time width $\tau$ of the timing pulses. Consequently, the rate of fuel flow Q corresponding to the control voltage $V_u$ as shown in FIG. 34 is supplied to the burner 1c of the gas turbine engine 1 through the electromagnetic metering valve 273.

With the above-described arrangements, if an inlet air pressure $P_1$ and temperature $T_1$ of the compressor 1a deviate from their normal conditions $P_{10}$ and $T_{10}$, by applying a known correction law to the corresponding fuel flow rate $\overline{G}_f$ and the number of revolutions $\overline{N}$ to obtain the corrected rate of fuel flow $G_f$ and the corrected number of revolutions $N$ from relationships $$G_f = P_{10}/P_1 \cdot \sqrt{T_{10}/T_1} \cdot \overline{G}_f \text{ and } N = \sqrt{T_{10}/T_1} \cdot \overline{N}$$

it is possible to use the fuel control pattern of FIG. 27 as such. Where the inlet air pressure $P_1$ and temperature $T_1$ of the compressor 1a deviate from the normal conditions $P_{10}$ and $T_{10}$, to obtain a corrected control voltage $V_c$ by applying the correction law to the control voltage $\overline{V}_u$ under the deviated condition and the control voltage $V_u$ under the normal condition, it is necessary to use a relationship $$V_u = P_{10}/T_1 \cdot \overline{V}_u.$$

Figure 35:
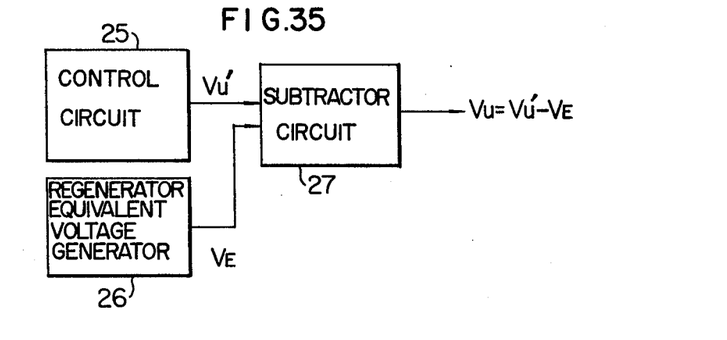
FIG. 35 is a block diagram showing another embodiment of the system according to the present invention.

Another embodiment of the invention including compensation means associated with the regenerator of a two-shaft gas turbine engine with regenerator will now be described with reference to the block diagram of FIG. 35. In FIG. 35, numeral 25 designates a control circuit for generating a provisional fuel control voltage $V_{u'}$ corresponding to the quantity of fuel fed when the amount of heat supplied to the induced air from the regenerator of the gas turbine engine is zero. The control circuit 25 is identical in construction with the fuel control system shown in FIG. 1 and the output voltage of its upper limit selection circuit 23 is used as the provisional fuel control voltage $V_{u'}$. Numeral 26 designates a regenerator equivalent voltage generator for generating a regenerator equivalent voltage $V_E$ corresponding to the rate of fuel flow equivalent to the amount of heat supplied to the induced air from the regenerator. Numeral 27 designates a subtractor circuit for subtracting the regenerator equivalent voltage $V_E$ from the provisional fuel control voltage $V_{u'}$. Consequently, the fuel control voltage $V_u$ for commanding the amount of fuel fed to the gas turbine engine with regenerator is generated at the output of the subtractor circuit 27.

Figure 36:
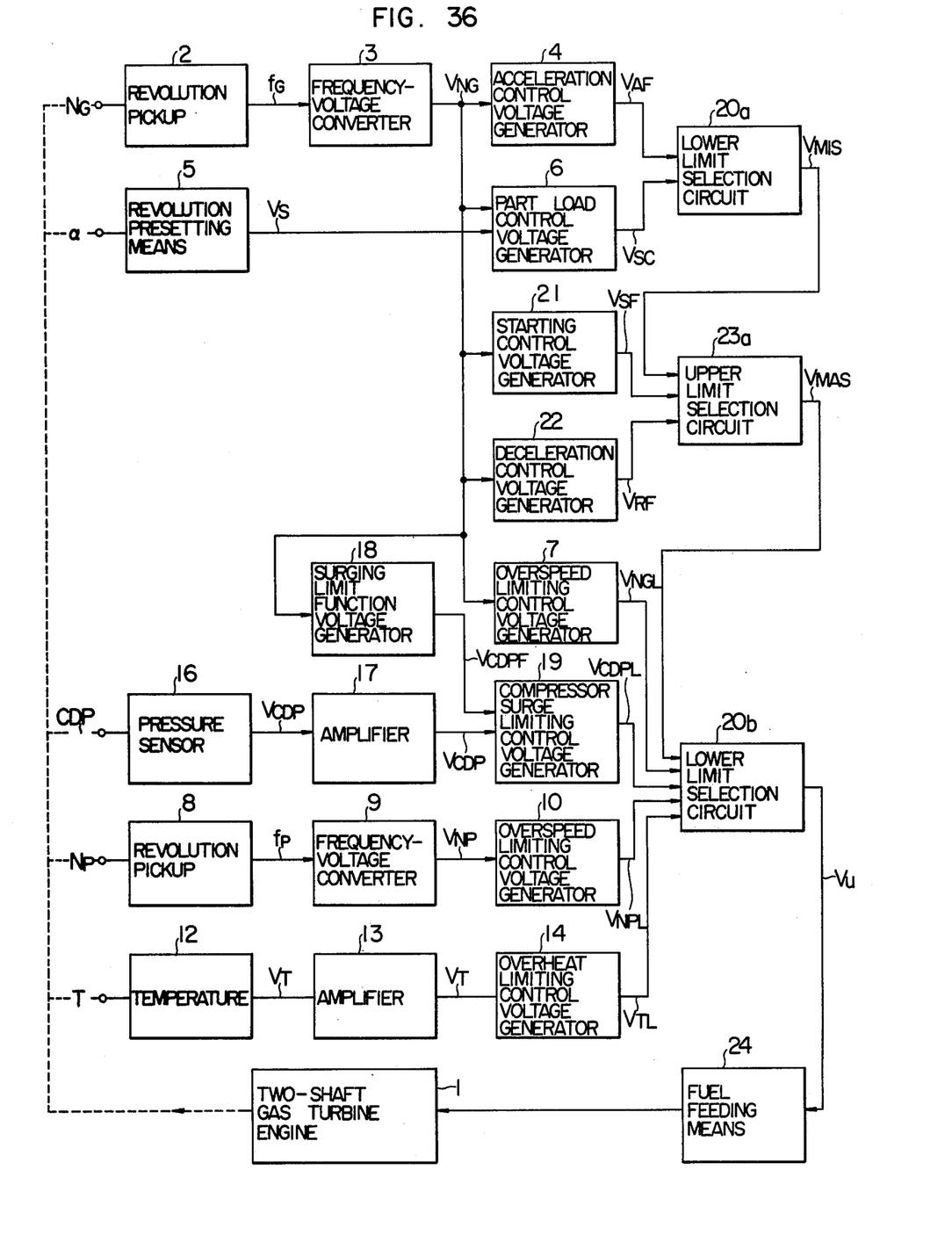
FIG. 36 is a block diagram showing another embodiment of the system according to the present invention.

Another embodiment of the invention is shown in FIG. 36, in which there is provided, in place of the lower limit selection circuit 20 and the upper limit selection circuit shown in FIG. 1, a first lower limit selection circuit 20a for selecting a smaller one of the acceleration control voltage $V_{AF}$ and the part load control voltage $V_{sc}$ as an output voltage $V_{MIS}$, an upper limit selection circuit 23a for selecting the greatest one of the output voltage $V'_{MIS}$ and the control voltages $V_{SF}$ and $V_{RF}$ as an output voltage $V_{MAS}$, and a second lower limit selection circuit 20b for selecting the smallest one of the output voltage $V_{MAS}$ and the control voltages $V_{NGL}$, $V_{CDPL}$, $V_{NPL}$ and $V_{TL}$ as an output voltage $V_u$ which determines the final fuel flow rate.

According to the above construction, it becomes possible to perform various controls by the control voltages $V_{NGL}$, $V_{CDPL}$, $V_{NPL}$ and $V_{TL}$ with priority to controls by the control voltages $V_{SF}$ and $V_{RF}$, while in the construction shown in FIG. 1 a higher one of the control voltages $V_{SF}$ and $V_{RF}$ at starting and deceleration times is selected preferentially to the control voltages $V_{NGL}$, $V_{CDPL}$, $V_{NPL}$ and $V_{TL}$ for the various controls. Thus it can be possible to attain various control operations under such an unusual condition that may occur in the case of rapid deceleration from the full load condition.

While, in the embodiments of the invention described above, the processing of signals takes the form of voltage processing, the present invention is not limited to these embodiments since many other modifications and changes are possible in which the processing of signals such as digital signals is utilized.

What is claimed is:

1. A fuel control system for a two-shaft gas turbine engine used in a running vehicle and having a compressor, a compressor turbine coupled to said compressor through one shaft and a power turbine coupled to a load through the other shaft, said fuel control system comprising:

compressor turbine speed detecting means for detecting the rotational speed (NG) of said compressor turbine;

accelerator position detecting means for detecting the position ($\alpha$) of an accelerator pedal;

acceleration fuel setting means for producing a voltage signal ($V_{AF}$) indicative of a fuel quantity for engine acceleration in response to the detection output of said compressor turbine detecting means;

part load fuel setting means for producing a voltage signal ($V_{SC}$) indicative of a fuel quantity for engine part load in response to the two detection outputs of said compressor turbine speed detecting means and said accelerator position detecting means;

first selection means for selecting one of said voltage signals produced by said two setting means to produce a first selection voltage signal ($V_{MIS}$) indicative of a fuel quantity for engine acceleration and engine part load;

starting fuel setting means for producing a voltage signal ($V_{SF}$) indicative of a fuel quantity for engine start in response to the detection output of said compressor turbine speed detecting means;

deceleration fuel setting means for producing a voltage signal ($V_{RF}$) indicative of a fuel quantity for engine deceleration in response to the detection output of said compressor turbine speed detecting means;

second selection means for selecting one of said three voltage signals produced by said first selection means, said starting fuel setting means and deceleration fuel setting means to produce a second selection voltage signal ($V_{MAS}$) indicative of a fuel quantity for engine acceleration, engine part load, engine start and engine deceleration;

surge limit setting means for setting the surge limit of said compressor in response to the detection output of said compressor turbine speed detectiing means;

pressure detecting means for detecting the pressure in said compressor;

surging fuel limiting means for producing a voltage signal ($V_{CDPL}$) indicative of a minimum fuel quantity when the detection output of said pressure detecting means exceeds the surge limit output of said surge limit setting means;

compressor turbine overspeed limiting means for producing a voltage signal ($V_{NGL}$) indicative of a minimum fuel quantity when the detection output of said compressor turbine speed detecting means exceeds a predetermined speed limit;

power turbine speed detecting means for detecting the rotational speed ($N_P$) of said power turbine;

power turbine overspeed limiting means for producing a voltage signal ($V_{NPL}$) indicative of a minimum fuel quantity when the detection output of said power turbine speed detecting means exceeds a predetermined speed limit;

third selection means for selecting one of said voltage signals of said second selection means, surging fuel limiting means, compressor turbine overspeed limiting means and said power turbine overspeed limiting means, said third selection means producing a voltage signal corresponding to a minimum fuel quantity for limiting said overspeeds and said surge with priority over said second selection voltage signal when at least one of said voltage signals of said three limiting means is produced; and fuel feed means for controlling fuel quantity for said gas turbine engine in response to said third selection voltage signal.

2. A fuel control system according to claim 1, further comprising:

temperature detecting means for detecting the temperature (T) of a combustion gas in said gas turbine engine; and overheat limiting means for producing a voltage signal ($V_{TL}$) indicative of a minimum fuel when the detection output of said temperature detecting means exceeds a predetermined temperature limit, said voltage signal of said overheat limiting means being applied to said third selection means to be selected.

* * * * *